Feb. 12, 1935.                O. F. McKEE                1,990,795
                       SEED PLANTER AND FERTILIZER
                           Filed Jan. 29, 1934
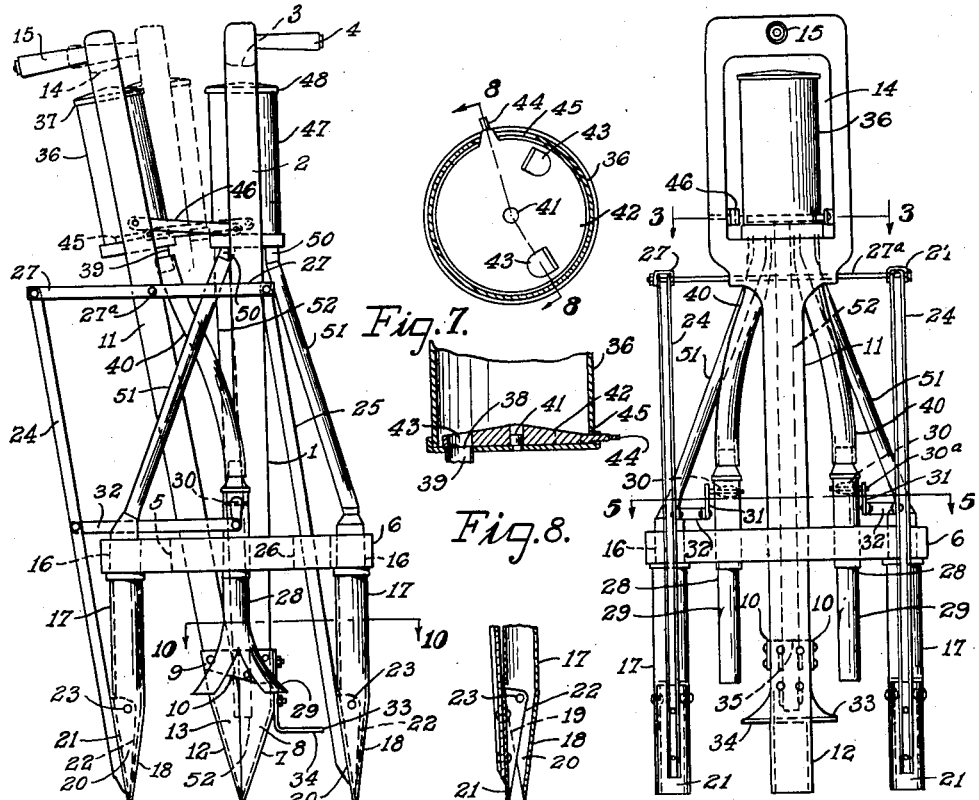
INVENTOR
Otto F. McKee,
BY
ATTORNEY Patented Feb. 12, 1935

1,990,795

UNITED STATES PATENT OFFICE 1,990,795

SEED PLANTER AND FERTILIZER

Otto F. McKee, near Eaton, Ohio

Application January 29, 1934, Serial No. 708,864

3 Claims. (Cl. 111—97)

This invention relates to new and useful improvements in a seed planter and fertilizer.

It is one of the principal objects of my invention to provide a simple and easily operated hand device for discharging seeds in the ground, and fertilizer between them, on the ground during the planting operation.

It is another object of my invention to provide a device which may be easily operated by one man to plant and fertilize efficiently and quickly watermelon, muskmelon and like seeds. In fact, with my device one man can plant in one hour, substantially, one and one-half acres with watermelon seed, and simultaneously fertilize the same.

Another object of my invention is to provide a hand-operated planter and fertilizer which will deposit the fertilizer upon the ground between the seeds that are deposited in it by the seed tubes, so that rain will carry the fertilizer into the ground around the sprouts in such a way as to promote, rather than curb, their growth. If the fertilizer is deposited in the holes drilled for the seed, the sprouts of the latter may be burned by the acids in the fertilizer, thus thwarting their growth. But with my device, the fertilizer is not sent into the ground with the seed, but is discharged upon the surface of the ground between the seed in order that it may be gradually carried down to them by rain or irrigation water.

Other important and incidental objects will be brought out in the following specification, and particularly set forth in the subjoined claims.

In the accompanying drawing, Figure 1 is a side view of my improved seed planter and fertilizer. Figure 2 is an end view of the same. Figure 3 is a cross sectional view through the seed and fertilizer magazines taken on the line 3—3 of Figure 2 and showing the valve discs in their closed positions. Figure 4 is a cross sectional view through the seed and fertilizer magazines as shown at Figure 3, with the valve discs rotated to an open position. Figure 5 is a sectional plan view of my device, taken on the line 5—5 of Figure 2 and showing the disposition of the various discharge tubes. Figure 6 is a fragmentary, sectional view of one of the seed planters in an open position. Figure 7 is a sectional plan view taken through the fertilizer magazine, showing its valve disc in its open position. Figure 8 is a cross sectional view taken through the fertilizer magazine and valve disc on the line 8—8 of Figure 7. Figure 9 is a detail view of the seed magazine valve disc. And Figure 10 is a sectional view taken on the line 10—10 of Figure 1, showing the delivery means.

Referring to the accompanying drawing for a detailed description of my invention, the numeral 1 designates a fixed actuating bar, having a wide portion 2 provided with a central rectangular aperture 3. Above the latter the bar 1 is provided with a handle 4 attached to the outer face thereof.

Below its middle portion, the bar 1 is secured in a rectangular opening 5 formed in the center of a square frame 6, supported by the bar and from which the latter projects perpendicularly. (See Figures 1, 2 and 5.)

The actuating bar 1, below the aperture 3, is substantially square, and has secured to its lower end a stationary blade member 7 formed with tapered parallel sides 8, 8. Attached to the bar 1, adjacent the upper end of the blade member 7, is a horizontal bracket member 9 formed with spaced arms 10, 10 between which the lower end of a movable actuating bar 11 is pivoted.

Below its pivotal connection, the bar 11 has secured thereto a movable blade member 12 formed with parallel tapering sides 13, 13, and positioned on the bar 11 to bring its sides 13, 13 into registry with the corresponding sides 8, 8 of the blade member 7, thus forming a closed receptacle between the tapering sides of the blade members. (See Figure 10.)

The bar 11 is substantially like the bar 1, extending upwardly through the opening 5, and has provided at its upper end an elongated opening 14 like the opening 3, and a handle 15 similar to the handle 4.

Extending vertically through the frame 6, at each corner thereof, is an aperture 16. In these apertures are secured the upper ends of delivery tubes 17, whose lower ends are cut away on one side thereof and flattened to form fixed blade members 18. These blade members are provided with openings 19 on one side, and between the openings and the opposite closed sides, with parallel taper side flanges 20. (See Figures 1, 2, 5, 6 and 10.)

Pivotally connected with each delivery tube 17, at the upper end of the blade opening, is a movable blade member 21. These blade members are essentially flat depending members formed with parallel tapering side flanges 22, 22 received between the flanges 20, 20 and through whose wide upper ends the pivotal connections 23 are effected.

Attached to the outer face of the blade member 21 at one side of the frame 6 are vertical actuating members 24, 24 extending above the latter and terminating below the opening 14.

The opposite blade members 21 also have attached thereto vertical actuating bars 25, 25 that project above the frame 6 through openings 26, 26 therein, where their upper ends are connected, by opposite links 27, 27, with the upper ends of the members 24, 24.

These links 27, 27 are pivotally connected at their middle portions with the movable actuating bar 11 by the cross bar 27ª which reciprocates these links to open and close the movable blade members simultaneously when the actuating bars 1 and 11 are moved together and apart. (See Figures 1, 2 and 5.)

Located at each side of the opening 5 is an aperture in which the upper end of a fertilizer discharge tube 28 is secured. Each tube projects below the frame 6, where it terminates in an inverted Y fitting 29 to provide spaced outlets for each tube 28. (See Figures 1 and 5.)

The fittings 29 are shorter than the delivery tubes 17, and terminate slightly above the upper ends of the movable blade members 21. In the upper end of each tube 28, where it projects above the frame 6, I have provided a horizontally pivoted butterfly valve 30 having an axial projection 30ª adjacent the side of the frame 6. Secured to this axial projection is a short crank 31, which is adapted to be actuated from the adjacent bar 24 by a link means 32. Now, when the bars 24, 24 are actuated as previously described, the link and lever means will effectively rotate the butterfly valves 30, to open and close the tubes 28. (See Figures 1, 2 and 5.)

Between the fittings 29 and the lower ends of the delivery tubes 17, I have secured to the outer face of the bar 1, a depth gauge 33. This gauge is formed with a wide lateral foot portion 34, and a narrow vertical bracket portion 35 adjustably connected with the bar 1. When the delivery tube blades are thrust into the ground, the foot portion 34 of the depth gauge will contact the surface of the soil, not only to prevent planting at an excessive depth but also to maintain the open ends of the fertilizer discharge tubes above the soil, for the most effective distribution of the fertilizer thereupon. (See Figures 1, 2 and 10.)

Secured within the recess 14 is a cylindrical fertilizer magazine or box 36, provided with a flanged cover 37. Formed in the bottom of the magazine 36 are spaced discharge openings 38, 38 as shown at Figures 3 and 7, and having below them short tube extensions 39, 39. Secured to the latter are flexible delivery tubes 40, 40, whose lower ends are secured to the upper ends of the tubes 28, 28. (See Figures 1, 3, 4, 7 and 8.)

Fixed in the center of the bottom of the magazine 36, and projecting upwardly therefrom, is a short pivot stud 41 upon which there is rotatably mounted a valve disc 42 having substantially the diameter of the magazine 36. The disc is beveled outwardly from its center to facilitate the discharge of the material thereon through spaced D shaped ports 43, 43 adjacent its periphery.

On one side of the disc 42 there is a radial projection 44, that passes through a short circumferential slot 45 formed in the wall of the magazine 36. Pivotally connected to the outer end of the projection 44 is a short link 46, offset as shown in Figures 3 and 4, and attached to the inner face of the opening 3 of the opposite bar 1.

When the actuating bars 1 and 11 are moved together, the link 46 will rotate the valve disc to bring the ports 43, 43 therein into registry with the discharge openings 38, 38 in the magazine bottom below the disc. Likewise, when the actuating bars are moved apart, the disc will be rotated in the reverse direction to close the openings 38, 38.

Secured within the recess 3 is a cylindrical seed magazine 47 provided with a flanged cover 48. Formed in the bottom of the magazine is a series or spaced discharge openings 49 as shown in Figures 3 and 4, and having below them short tube extensions 50. Secured to the latter are outwardly sloping delivery tubes 51 whose lower ends are secured to the upper ends of the delivery tubes 17 and a center vertical delivery tube 52 that projects downwardly through the opening 5 against the face of the bar 1 and terminates between the blades 7 and 12 for discharge therebetween.

Secured in the center of the bottom of the cylinder 47 is a short pivot stud 53, like the stud 41. Upon the latter there is rotatably mounted a disc valve 54 similar to the valve 42 and provided adjacent its periphery with a series of spaced ports 55. These ports, when the valve is rotated, will be brought into registry with the openings 49 to discharge seed through the delivery tubes for deposit between the blades 18 and 21 and the blades 7 and 12. (See Figures 3, 4 and 9.)

The disc 54 is formed with a radial extension 56 which projects through a circumferential slot 57 in the wall of the magazine 47.

Pivotally attached to the outer end of the extension 56 is a link 57ª, like the link 46, and attached to the inner face of the opening 14 of the opposite bar 11. (See Figures 1, 2, 3 and 4.)

When used to properly plant and fertilize various kinds of melon seed, the depth gauge 33 may be adjusted to a proper setting to deposit the seed at the required depth, depending on varying soil and climatic conditions.

Seed to be planted is placed in the seed magazine 47, and fertilizer, in a dry granulated state, is deposited in the magazine 36.

In operation, the planter is carried and actuated by the handles 4 and 15. It is first forced downwardly, with the blades 18, 20 and 7, 12 penetrating the soil until its further downward movement is arrested by the depth gauge 33. (See Figures 1 and 2.)

The actuating bars are now moved together by the handles 4 and 15, causing the movable blades 12 and 20 to move away from their respective stationary blades 7 and 18 to form beneath the soil pockets to receive the seed. (See Figures 6 and 10.)

When the actuating bars 1 and 11 are thus brought together, the disc valves 42 and 54 will be rotated to bring their respective ports in registry with the discharge openings in the magazines 36 and 47.

Seed will now be deposited through the various delivery tubes in the earth pockets previously formed, and with the butterfly valve 30 in its vertical or open position, fertilizer will be distributed on top of the soil between these pockets through the spaced outlets of the fittings 29, 29.

By increasing the thickness of the valve disc and the size of the apertures therein, the amount of fertilizer or number of seeds therein may be increased.

By my improved method of depositing the fertilizer and distributing it, the seed and tender sprouts are not harmed, the granulated fertilizer being conveyed to the roots of the plants in a gradual and nourishing manner by the moisture at the surface of the soil.

Having described my invention, I claim:

1. In a seed planter and fertilizer, the combination of a pair of bars, one bar being movable toward and away from the other bar, a seed box carried by one bar and a fertilizer box carried by the other bar, seed discharge tubes in communication with the seed box, fertilizer distributing tubes in communication with the fertilizer box, the fertilizer tubes being between, and above the lower ends of, the seed distributing tubes, a valve in said seed box, valves in the fertilizer tubes, and link means actuated by the movable bar to open said valves simultaneously to discharge a predetermined amount of seeds and fertilizer through their respective tubes, the seeds being discharged by the seed distributing tubes around and below the lower ends of the fertilizer tubes.

2. In a seed planter and fertilizer, the combination of a pair of bars, one bar being movable toward and away from the other bar, a seed box carried by one bar and a fertilizer box carried by the other bar, a central seed discharge tube in communication with the seed box, for entrance at its lower end into the ground, fertilizer distributing tubes in communication with the fertilizer box, the fertilizer tubes being above the lower end of the seed discharge tube, a valve in said seed box, valve means in said fertilizer tubes, said seed box valve and fertilizer tube valve means being operable by the movable bar to permit the discharge of seed and fertilizer from the seed box and fertilizer tubes respectively, and a depth gage secured to the bar carrying the seed box between the lower end of the seed discharge tube and the lower ends of the fertilizer tubes, whereby the fertilizer tubes will be maintained in a position to discharge fertilizer upon the ground around the seed hole formed by the seed discharge tube.

3. In a seed planter and fertilizer, the combination of a pair of bars, one bar being movable toward and away from the other bar, a seed box carried by one bar and a fertilizer box carried by the other bar, four corner seed discharge tubes having flattened lower ends for entrance into the ground, a central seed discharge tube, all of said tubes being in communication with the seed box, fertilizer distributing tubes between the central seed tube and the corner seed tubes, and in communication with the fertilizer box, the lower ends of the fertilizer tubes being bifurcated and above the lower ends of the seed tubes, and a depth gage secured to the central seed tube between the lower ends of the seed tubes and the lower ends of the fertilizer tubes, whereby the fertilizer tubes will be maintained in a position to discharge fertilizer upon the ground between the holes formed by the seed tubes.

OTTO F. McKEE.